June 11, 1957 R. H. BARKER 2,795,706

FERRORESONANT CIRCUITS

Filed June 14, 1954 5 Sheets-Sheet 1

Inventor
RONALD H. BARKER
By Stevens, Davis, Miller & Mosher
Attorneys

Inventor
RONALD H. BARKER
By Stevens, Davis, Miller & Mosher
Attorneys

Inventor
RONALD H. BARKER
By Stevens, Davis, Miller & Mosher
Attorneys

RONALD H. BARKER
*Inventor*
By Stevens, Davis, Miller & Mosher
*Attorneys*

Inventor
RONALD H. BARKER
By Stevens, Davis, Miller & Mosher
Attorneys 2,795,706

FERRORESONANT CIRCUITS

Ronald Hugh Barker, Highcliffe, Christchurch, England, assignor to National Research Development Corporation, London, England, a British corporation Application June 14, 1954, Serial No. 436,641
Claims priority, application Great Britain June 16, 1953
16 Claims. (Cl. 307—88)

The present invention relates to two-state circuits which employ ferroresonant circuits, that is circuits involving inductors having magnetic cores which can be easily saturated with magnetic flux so that the inductance value of the inductor depends to a pronounced degree upon the applied alternating current. As a result a ferroresonant circuit, which has as one of its components an inductor of this type, can be made to operate stably in two distinctly different modes or states.

The basic part of a two-state circuit according to the invention is a ferroresonant circuit formed by connecting a capacitor in parallel with an inductor having an easily saturable ferromagnetic core. The current taken from a source of alternating current connected across a parallel form of ferroresonant circuit is much less than that required to maintain resonance, and as a result the source need not have an excessively low output impedance.

The parallel resonant circuit is connected across a source of alternating current in series with a capacitor in order that the voltage across the tuned circuit may vary despite the voltage of the source remaining constant.

According to the invention therefore, a two-state electrical circuit comprises a capacitor and a ferroresonant circuit arranged in series, the ferroresonant circuit consisting of an inductor having a magnetic core and a capacitor connected in parallel with the inductor, means for applying an alternating electrical current across the capacitor and ferroresonant circuit whereby the ferro resonant circuit can operate stably in only two distinctly different states, one of which is a resonant state, in which the circuit is resonant and the core of the inductor is magnetically saturated, and an output connection from the ferroresonant circuit on which signals of one of two types are produced in accordance with the state of the ferroresonant circuit.

The invention and a number of applications and further features thereof will now be described with reference to the accompanying drawings in which.

Figure 11:
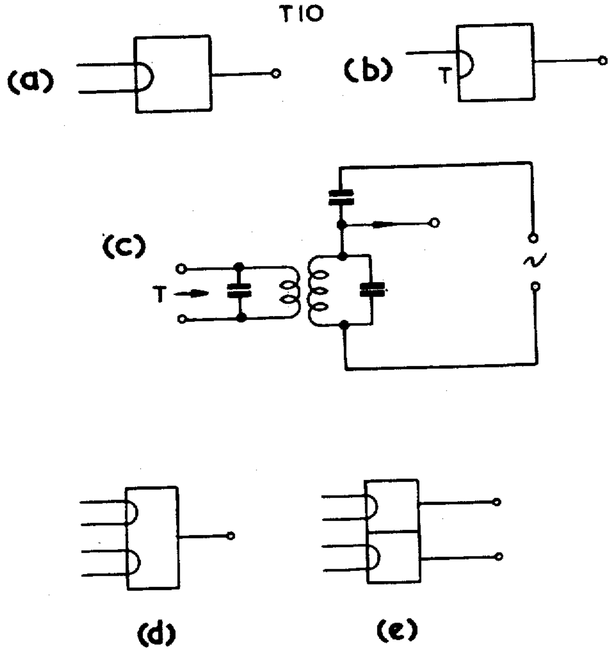

Figures 11(*a*) to 11(*e*) show symbols representing various types of ferroresonant circuits; while Figures 12 to 17 show circuit ararngements for carrying out various digital computing and storage operations involving ferroresonant circuits represented by symbols shown in Figures 11(*a*) to 11(*e*).

Figure 1:
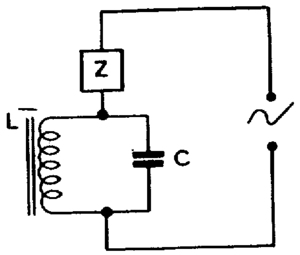
Figure 1 shows a basic ferroresonant circuit arrangement.

Figure 1 shows a circuit ararngement in which an inductor L and capacitor C form a parallel tuned circuit which is connected in series with a low impedance Z to an R. F. power source. The inductor L is constructed with a ferromagnetic core capable of being easily saturated with magnetic flux. Materials such as Mumetal, Permalloy C are suitable. The inductor is a non-linear device and has a high inductance when the alternating current through it is small and a low inductance when the alternating current through it is large and exceeds the value necessary to saturate the core. The circuit of Figure 1 may have two stable states or modes of operation. In state 1, the disonant state, the inductance is high and has little shunting effect upon the capacitor C. The voltage across the tuned circuit is small and the circulating current is small. In state 2, the resonant state, the inductance is low and resonates with the capacitor C at the frequency of the supply. A large circulating current is maintained so that the inductance remains indefinitely at the low value.

Figure 2:
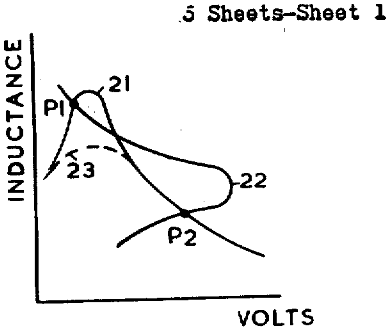
Figure 2 is a graph explaining the action of the circuit shown in Figure 1.

In Figure 2, curve 21 shows a typical example of the way in which the inductance of the coil varies with the voltage applied across it. Curve 22 is the resonance curve of a parallel tuned circuit showing the relation between the inductance and the voltage. Curves 21 and 22 intersect at three points of which two, namely $P_1$ and $P_2$, correspond to the two stable states (1 and 2 respectively) of operation.

The impedance Z is necessary in order that the voltage across the tuned circuit may vary despite the R. F. supply voltage remaining constant. This impedance may take almost any form, such as an inductor, resistor, capacitor or even a second ferroresonant circuit. In this last case one circuit is in state 1 while the other is in state 2 and suitable triggering arrangements can cause them to change over. This case has the advantage that the loading upon the R. F. power supply remains constant.

The circuit may be triggered from state 1 (high inductance) to state 2 (low inductance) in a variety of ways, which depend upon modifying either one of or both of the curves 21 or 22 shown in Figure 2 such that they intersect only at point $P_2$. For example, the core may have a steady component of magneto-motive force superimposed upon it, by bringing up a permanent magnet or by passing a steady current through either the main coil or a separate winding. The maximum inductance is thereby lowered and curve 21 is modified to curve 23 which intersects curve 22 at point $P_2$ only. Alternative ways are to decrease the supply frequency so that the resonance curve 22 moves upwards, or to increase the supply voltage to cause it to move to the right. In both cases the intersection point $P_1$ disappears.

The circuit may be triggered from state 2 to state 1 by arranging for the intersection at point $P_2$ to disappear. Only modifications to curve 22 are practicable. It may be lowered by increasing the supply frequency, moved left by decreasing the supply voltage, or the peak may be flattened by connecting an external load in parallel with the resonant circuit.

Figure 3:
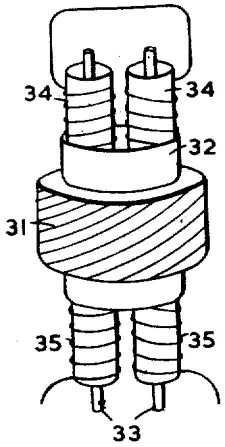
Figures 3 and 5 show constructions of inductors for use in a ferroresonant circuit.

A suitable construction of an inductor is illustrated in Figure 3. The main coil 31 is wave-wound upon a thin walled insulating tube 32. Inside the tube are two strips of ferromagnetic material 33 each inside a narrow tube 34 upon which is wound a single layer winding 35 through which a triggering current may be passed. The reason for the double core is that the two trigger windings are connected in opposition so that no power at the supply frequency is coupled back into the triggering circuit. Overall dimensions of a typical unit are 1 inch long by ¼ inch diameter. This method of construction is simple and robust and in particular there is no need for expensive toroidal winding. It is not necessary for units to be individually screened or shielded as provided coils are separated by ¼ inch or more there are no significant mutual interactions.

The average power dissipated in a typical core is of the order of 10 milliwatts. Approximately 2 milliamps through a trigger winding of 10 ohm resistance is sufficient to cause a change from state 1 to state 2.

In order to increase the sensitivity of the inductor to its triggering circuit, the triggering windings can be more closely coupled and this may be achieved by dispensing with the conventional tubular coil former. In manufacture the trigger windings are first wound on a mandrel of steel or other suitable material and are preferably oval in cross-section. The mandrels with their trigger windings are supported inside a cylindrical mould of internal diameter only just more than sufficient to accommodate them. The space within the mould is then filled with a suitable material such as polystyrene or a casting resin.

The mandrels are then withdrawn leaving a compact moulded unit in which the trigger windings are embedded and with space for the iron cores to be inserted. The unit thus possesses good mechanical strength, and there is no space wasted. The trigger winding circumference need be only just large enough to receive the core.

Each core may be one or more strips or wires of ferromagnetic material. A preferred method of construction is to use strips of metal in which the long edges have been rolled over so that the cross-section is similar to part of an ellipse. In this way a greater amount of metal may be inserted than if a flat strip were used, with consequent proportionate reduction in coil dimensions. A suitable alternative, however, is to use as each core, two or more narrower strips.

The main winding may be wave or otherwise wound outside the moulding. The internal diameter is much less than would be possible with methods of construction using formers, with consequent increased coupling to the core leading to a higher ratio of maximum to minimum inductance.

The reduction of internal diameter of the main winding may be achieved by using only a single core. This core may be of strip material which has been rolled round to form a nearly closed cylinder. This core is placed inside a thin walled former which may be a quartz or ceramic tube in which the core was annealed. It is advantageous to slip the core round a ceramic rod for annealing to prevent the core from collapsing during annealing, and so forming a short-circuited turn. It also helps to prevent subsequent damage by handling. The ceramic rod may remain in the finished inductor and increases the robustness of the structure.

The main coil is then wound directly on to the ceramic former, so that very tight coupling to the core is obtained. The trigger winding is wound on in two sections which are disposed symmetrically in opposite directions on the two sides of the main winding. If the symmetry is good, current in the main winding does not induce any voltage across the trigger winding. In this way high trigger sensitivity may be obtained, since the number of turns may be large without causing the diameter of the main winding to be increased.

In some circuit applications no trigger winding is needed, and this form of construction is then preferable.

Any of the types of inductors which have now been described may advantageously employ a core or cores whose cross-section is reduced at the centre relative to the ends. This may be done either by reducing the thickness, as by etching, or by punching out a suitable shape from strip or sheet. The core may also be rolled or curled as previously described. The advantage of having the increased amount of material near the ends of the cores is that saturation is obtainable with fewer ampere turns to the coil.

Figure 4:
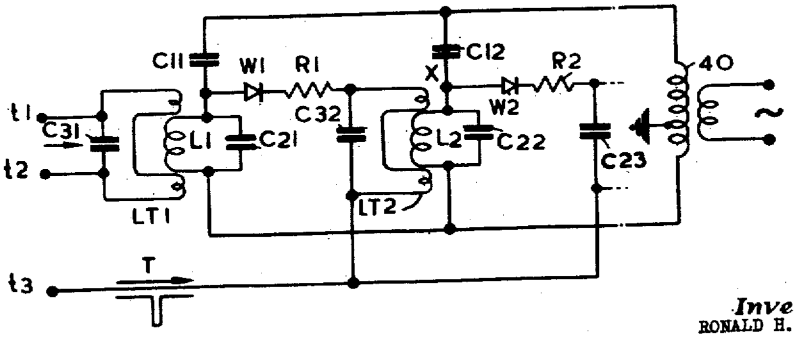
Figures 4, 6, 7, 9 and 10 show various arrangements involving ferroresonant circuits.

The transfer of digital information stored in one unit to another unit is the basis of many digital operations. If at the time of transfer further information can be written into the first unit, the circuit becomes the basis of a delay chain or shifting register. Figure 4 shows a preferred method of transferring information from a first ferroresonant stage to a second stage.

In the two ferroresonant stages shown, the first two in a shifting register, the resonant circuits are made up of coils L1 and L2 and capacitors C21 and C22 respectively. The stages are provided with trigger windings LT1 and LT2 having respectively, capacitors C31 and C32 connected across them. The first stage may be triggered from the disonant state 1 to the resonant state 2 by applying a triggering pulse across terminals *t1* and *t2*, the resulting current through the trigger winding LT1 inducing a direct component of magnetic flux in the core. The actual process of changing from state 1 to state 2 is accompanied by an increase in this direct component of flux, and this in turn induces a voltage in the trigger winding LT1. The polarity of this voltage is such that the current due to it tends to assist the triggering action. The input impedance of the trigger winding is therefore non-linear and it is in fact, negative once a certain threshold of current is exceeded. The capacitor C31 provides a low impedance path through which the induced current may flow and materially reduces the power required to initiate triggering.

An electrical pulse which will be referred to as the transfer pulse T has to perform two functions in the transfer of a signal from stage 1 to stage 2 which are:

(1) To reset stage 1 to state 1, and
(2) To reset stage 2 into state 1 and immediately trigger it into state 2 if, and only if, stage 1 was previously in state 2.

For the resetting operation use is made of the principle of loading already referred to. The transfer pulse is applied to a terminal *t3* which is normally at a voltage V, say, which is just greater than the peak R. F. voltage developed across the resonant circuit. The resetting of stage 2 will be explained. The terminal *t3* is connected through a loading resistor R2, a rectifier W2 and the triggering circuit of the third stage (of which the capacitor C23 is shown) to the point X as shown in Figure 4. Normally the transfer wire is more positive than the point X so that the resistance of the rectifier W2 is high and the resonant circuit is only lightly damped.

If a transfer pulse T, negative-going, is applied to the terminal *t3*, the rectifier W2 conducts during the peaks of the R. F. voltage cycle so that the circuit is heavily loaded and the state is changed from 2 back to 1. In Figure 4 the R. F. supply is shown with an earthed tap on the supply transformer 40. This has the advantage that the voltage present across the tuned circuit when in the non-resonant condition can be largely backed off. The R. F. voltage relative to ground at point X is therefore very small in the non-resonant state.

Resetting of stage 1 is accomplished in a precisely similar manner, except that the rectified current through the load resistor R1 is made to flow through the trigger coil LT2 of stage 2. Assuming stage 1 is resonant, that is, is in state 2, the transfer pulse causes a current flow which initially charges capacitor C32. At the same time stage 2 is set into state 1. After an interval determined by the product of the capacitance of capacitor C32 and the inductance of the trigger winding LT2, the capacitor C32 discharges through the trigger winding. Provided that this interval exceeds the duration of the transfer pulse there will be nothing to prevent the build up of resonant oscillations in stage 2, and the current flow through the trigger winding does in fact initiate this.

The capacitors C31 and C32 therefore perform two important functions. They provide a low impedance path for currents induced by the circuit being triggered, so increasing the triggering sensitivity, and provide a subsidiary store for the information for the duration of the transfer pulse. For high digit rates the transfer pulse should persist for about one cycle of the R. F. supply and capacitors C31 and C32 should be chosen so that they are completely discharged in about three cycles of the R. F. supply voltage. If these conditions are met the circuit may be made to operate at a rate corresponding to five cycles of R. F. voltage per digit. The maximum radio frequency which can be used depends mainly upon the thinness of the core material. If the material is too thick or if the frequency is too high, eddy current losses lower the Q of the circuit to such an extent that the ferroresonant effect is not obtained. The maximum operating frequency is approximately inversely proportional to the square of the thickness of the core metal. Material one thousandth of an inch thick can be used at frequencies up to at least 250 kc./s., i. e. 50,000 digits per second.

Figure 5:
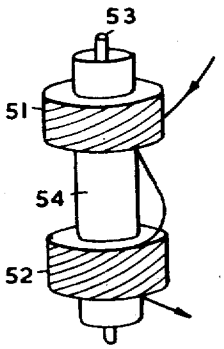

Successive stages such as those of Figure 4 may be connected in tandem indefinitely, to form a shifting register circuit. An alternative method will now be described in which a separate trigger winding is not required. The type of coil construction is illustrated in Figure 5.

Figure 6:
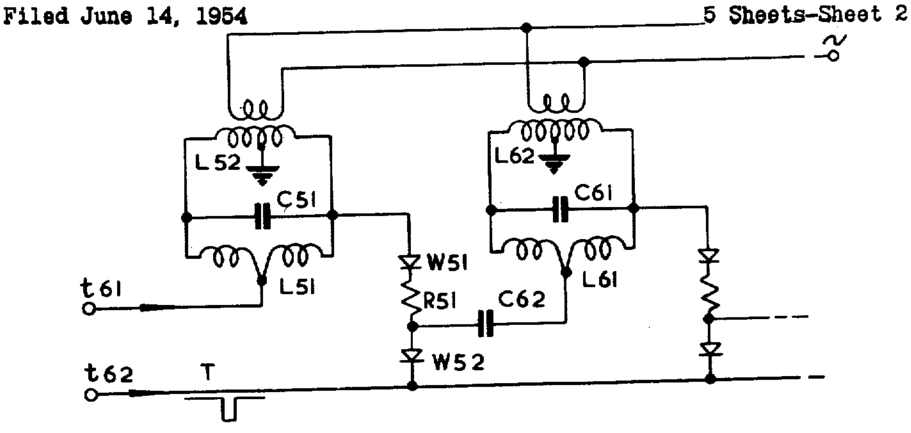

Two coils 51 and 52 separated by about one third of the length of a core 53 are wave wound upon a small diameter tube 54 in which the core is mounted. The centre-tapped inductance so formed is connected as an inductor L51 and an inductor L61 in the circuit shown in Figure 6. Capacitors C51 and C61 form the ferroresonant circuits with inductors L51 and L61 respectively, while the series impedances Z for the circuits are provided by centre-tapped inductors L52 and L62 of orthodox design, which are coupled by mutual inductance to the R. F. power supply.

The first circuit comprising inductor L51 and capacitor C51 is triggered from stage 1 to state 2 by passing a current from a terminal *t*61 through both the inductors L51 and L52 from the centre-tap of the inductor L51 to that of the inductor L52. The symmetry of the system ensures that no component at the supply frequency is induced back into the triggering circuit. Triggering from state 2 back to state 1 may be accomplished by reducing the voltage of the R. F. supply for a short time to a value lower than that required to maintain resonance. Transfer of the signal from stage 1 to stage 2 is accomplished by means of a negative-going transfer pulse T applied to the transfer wire from a terminal *t*62. This pulse must be timed to follow immediately upon the interruption or reduction of the R. F. supply. If stage 1 is resonant the coupling capacitor C62 is charged via the rectifier W51 and current limiting resistor R51, while if stage 1 is nonresonant, the capacitor C62 remains uncharged; the transfer wire being normally biased positively to a voltage higher than that to which capacitor C62 can be charged. The negative-going transfer pulse T then discharges the capacitor C62 via the rectifier W52 and the windings of stage 2. Hence stage 2 will be triggered by this discharge current into state 2 if and only if, stage 1 was previously in state 2.

A third method of digit transfer is possible without using rectifiers in which the stages are coupled by mutual inductance. This method uses an arrangement such as that shown in Figure 7.

Figure 8:
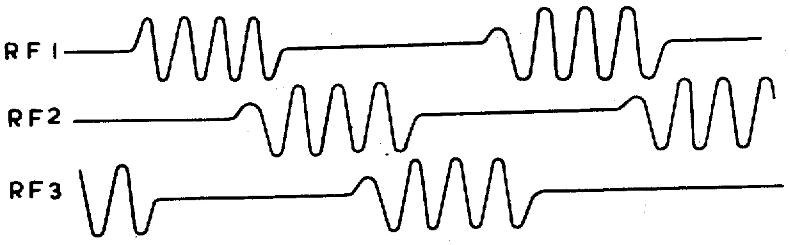
Figure 8 shows voltage waveforms occurring in the arrangement shown in Figure 7.

A number of simple coils are suitably spaced along a long tube 71 containing a narrow strip of ferromagnetic saturable material. Each coil 1, 2, 3 (shown in section), is connected in parallel with a capacitor C6, the combination being in series with a capacitor C7 (the impedance Z of the basic ferroresonant circuit shown in Figure 1) and one of three separate R. F. power supplies RF1, RF2 and RF3 as shown. Each R. F. supply is periodically interrupted for time which is sufficient for the resonant oscillations to fall below threshold amplitude. The timing is such that the supply RF2 builds up just as, or just before, the supply RF1 decays, the supply RF3 builds up just as, or just before, the supply RF2 decays, and so on as illustrated in Figure 8. Signals of this type may be generated by well known methods.

Figure 7:
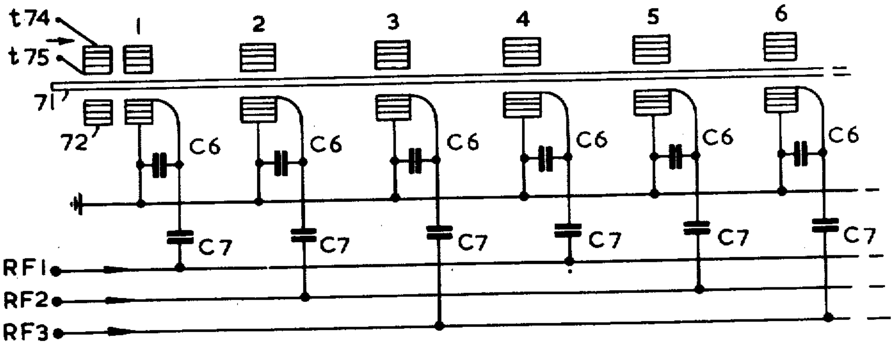

The mode of operation of the circuit of Figure 7 is as follows. The initial input from terminals *t*74 and *t*75 is via a separate winding 72 closely coupled to the coil 1 of the first ferroresonant circuit, so that when power is available on the line RF1 this circuit is set into either state 1 or state 2. The spacing of the other coils 2, 3, 4 . . . is important. They must be sufficiently far apart to ensure that the coupling between coils 1 and 3 (when power is available on both lines RF1 and RF3) is insufficient to trigger stage 3. On the other hand the coupling between coils 1 and 2 must be sufficient to ensure that when power is applied to the line RF2, stage 2 will be triggered into state 2 if stage 1 was previously in state 2. It is not difficult to ensure that the coupling lies between the two limits indicated. The transfer of information from stage 2 to stage 3 is via the mutual inductance between the coils 2 and 3 and takes place on the application of power to the line RF3.

In this method of operating it is essential that there shall be two stages non-resonant between any two resonant stages. If therefore it is possible for consecutive digits to be ones (in binary notation) it is necessary to allow three coils per digit. Advantages of this method of operation are that no rectifiers are required and that the direction of propagation along the line may be reversed by interchanging the supplies connected to the lines RF2 and RF3. A disadvantage is that during the time allowed for one digit it must be possible for oscillations to build up and decay three times, so that the maximum digit frequency is about one twentieth to one thirtieth of the supply frequency.

Figure 9:
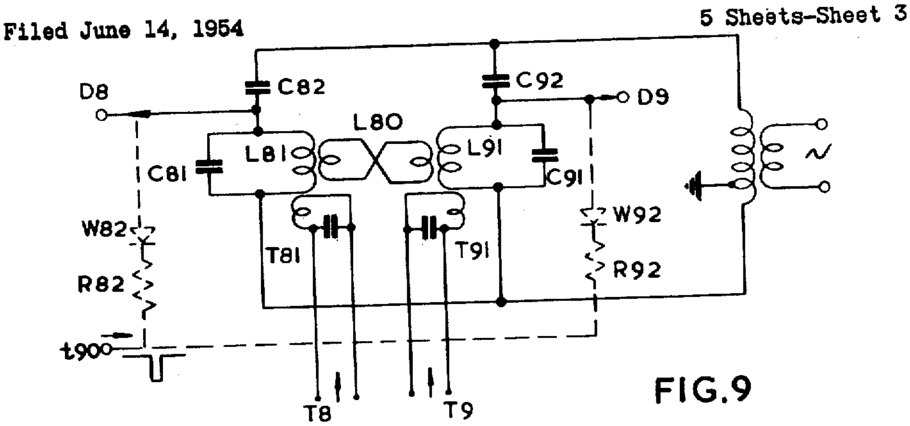

The circuit of Figure 7 makes use of mutual coupling between coils in different ferroresonant circuits. All the coils are wound in the same direction so that the mutual inductance is positive and a coil which is in state 2 (resonant) assists the triggering of an adjacent coil to that state. If two coils are connected with a suitable negative mutual inductance they function as a balanced pair. It is possible to arrange that one and only one circuit is in the resonant condition, and that either circuit may be triggered into this condition. The mutual inductance may be provided either by winding both coils on the same core or by a coupling winding of few turns. Figure 9 shows a suitable circuit arrangement employing a coupling L80 between coils L81 and L91.

Figure 10:
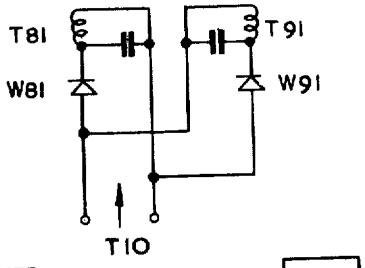

This circuit is very analagous to an Eccles-Jordan trigger circuit. It has two input circuits T8 and T9 and two output connections D8 and D9. It may be triggered one way by a current pulse through circuit T8 and back again by a current pulse through circuit T9. The circuit operates as a binary counter unit if the two trigger windings T81 and T91 are connected together. This may be done either by connecting the windings in series or in parallel. In the latter case a greater triggering current is required since it divides between the two windings. Only one triggering capacitor is needed in either case, since for the series connection it may be connected across the two windings together. A further useful device based upon this negative mutual coupling arrangement between two ferroresonant circuits is the current balance or current comparator. The circuit is as in Figure 9, but with provision for simultaneously resetting both sides to state 1. This may be done by any of the means previously described but the method of loading is to be preferred by which a load resistor R82, R92 in series with a rectifier W82, W92 is connected from each output terminal to a resetting terminal *t*90 as shown in broken lines in Figure 9. The resetting wire is normally biased sufficiently positive for the rectifiers W82, W92 to not conduct. A negative-going pulse of suitable amplitude resets both halves to state 1. On the termination of this pulse oscillations tend to build up in both circuits. When a certain critical amplitude is reached the effect of the mutual coupling L80 ensures that only in one circuit does the voltage continue to grow and in the other it dies down again. The choice of which circuit becomes resonant depends in a very senstive manner upon currents flowing in the trigger windings T81 and T91. The circuit with the larger trigger current becomes resonant, hence the device acts as a current balance. The direction of current flow is not important. A variant of this device is shown in Figure 10 in which the result is sensitive to the direction of a single current applied at T10 may be constructed by connecting together the trigger windings T81 and T91 via rectifiers W81 and W91 as shown. Current in one direction passes through trigger winding T81 and that in the other direction through trigger winding T91.

The current comparator may be balanced by making either of the capacitors C81 or C91 variable over a small range, or by a resistance potentiometer connected between the two output terminals D8 and D9 with the variable topping taken to earth. When such a circuit is carefully balanced it is sensitive to trigger currents which are only a small fraction of a milliamp. Since the resistance of the trigger winding may also be low, this corresponds to a voltage of the order of one millivolt. The device is therefore very useful for comparing currents or voltages in two circuits which are insulated from each other.

A considerable increase in the flexibility with which ferroresonant units may be interconnected is brought about by the provision of double trigger windings. The method of construction is as indicated in Figure 3 except that a second trigger winding is wound over the first upon each leg of the core. Both trigger windings are balanced with respect to the main winding to avoid back coupling of the power supply frequency into the trigger circuit.

It is convenient to make use of certain functional symbols to aid the description of the more complicated arrangements embodying ferroresonant circuits. Figures 11(*a*), 11(*b*), 11(*d*) and 11(*e*) show four symbols which will be used in the subsequent description. In each symbol the output terminal or terminals is shown on the right and the trigger input connection is shown on the left. The symbol shown in Figure 11(*a*) represents the ferroresonant circuit shown in Figure 11(*c*) when both terminals of the trigger winding are connected to special points. The symbol shown in Figure 11(*b*) represents the circuit shown in Figure 11(*c*) when one terminal is returned to a standard transfer pulse line T. Figure 11(*d*) shows a symbol which represents the circuit shown in Figure 11(*c*) provided with two trigger windings. The symbol shown in Figure 11(*e*) is for a balanced pair as shown in Figure 9 in which the mutual inductance provided by the coupling L80 is negative. Either section may also have double windings.

A trigger circuit which may be used to staticise binary digits in a digital computer and which employs ferroresonant circuits has already been described with reference to Figure 9. A shifting register which may be used to store binary digits has also been described with reference to Figures 6, 7 and 8. In addition, ferroresonant circuits can be combined, as valve circuits are combined in existing computers, to perform various computing operations.

Figure 12:
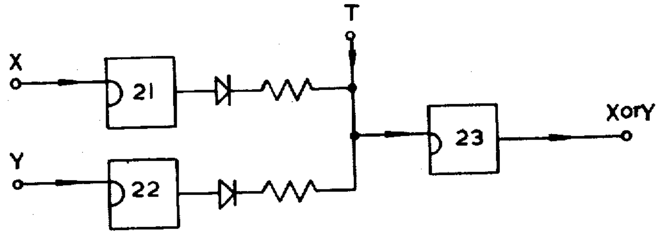
Figures 13, 14:
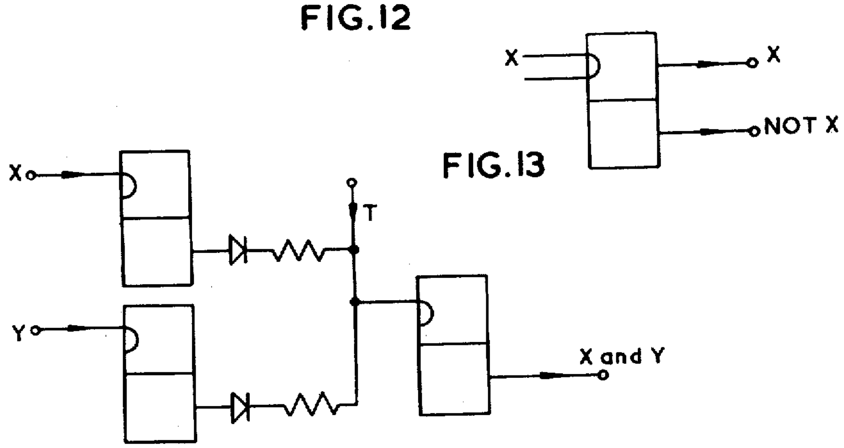

For example, three basic logical operations can be carried out by the circuits shown in Figures 12, 13 and 14.

The circuit shown in Figure 12 can perform the "or" operation, that is Boolean addition. The input signals X and Y are first set up in the units 21 and 22 respectively. Application of a transfer pulse T sets the unit 23 into the resonant condition if either the unit 21 or the unit 22 (or both) are in that condition and immediately resets the units 21 and 22 so that they are ready to receive new information. The circuit may be extended to have more than two parallel inputs if desired.

The balanced pair shown in Figure 11(*e*) can be used to perform the "not" operation by providing in addition to an output corresponding to the input, an inverse or "not" output as shown in Figure 13. By adjustment of any of the circuit constants the unit may be given a slight bias to one side so that the side producing the inverse output tends to be resonant. At or just before the instant of application of the signal X, both sides of the pair are reset to the non-resonant condition. Then if a pulse is present in the trigger winding the side producing the normal output will become resonant, otherwise the other side producing the inverse output will become resonant.

The "and" operation may be performed by making use of the relationship: X and Y≡not (not X or not Y). A circuit for carrying this out is shown in Figure 14. Each of the balanced pairs performs as the balanced pair shown in Figure 13 does.

Addition of two binary numbers obeys the binary addition table:

$$0+0=0$$
$$1+0=0+1=1$$
$$1+1=0$$

Figure 15:
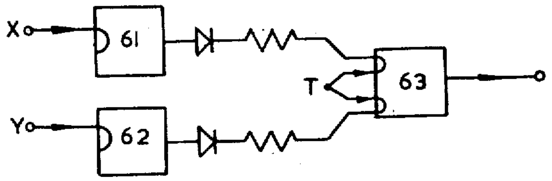

This operation is particularly simple to carry out by a circuit using a ferroresonant unit with a double trigger winding as shown in Figure 15.

Information on the state of X and Y is first set up in units 61 and 62. A transfer pulse T resets both these units 61 and 62, the currents passing through the trigger windings of a unit 63. The directions of the currents through these windings is such that the effects cancel when pulses pass through both simultaneously. A pulse through either one winding therefore triggers unit 63 into resonance but pulses through both together do not.

A chain of binary counter units is often required to count regular or random events. The balanced pair shown in Figure 9 and symbolised in Figure 11(*e*) is suitable for this purpose and one stage can be made to trigger another by connecting them as shown in Figure 16.

A current pulse through the trigger windings of stage 81 causes it to change state. If the change is such that the lower half becomes resonant, the build up of voltage will cause the capacitor C8 to become charged via rectifier W8. The charging current flows through the trigger windings of stage 82 and causes it to change its state. When stage 81 again changes its state, capacitor C8 discharges through resistor R8, whose resistance must not be low enough to excessively load the resonant circuit, nor high enough to limit the maximum rate of counting. Similarly a small resistance in series with W8 may be required to reduce the loading on the resonant circuit. Any number of binary units may be connected in the manner shown. The counter may also be reset to any desired number by a connection such as that shown dotted in Figure 9 to one side only of each stage.

Figure 16:
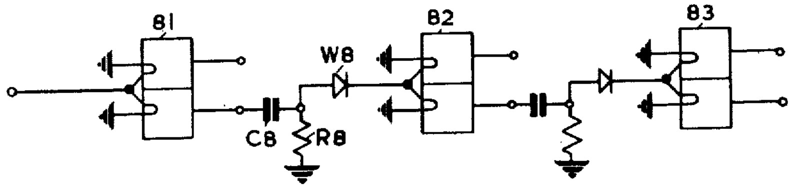
Figure 17:
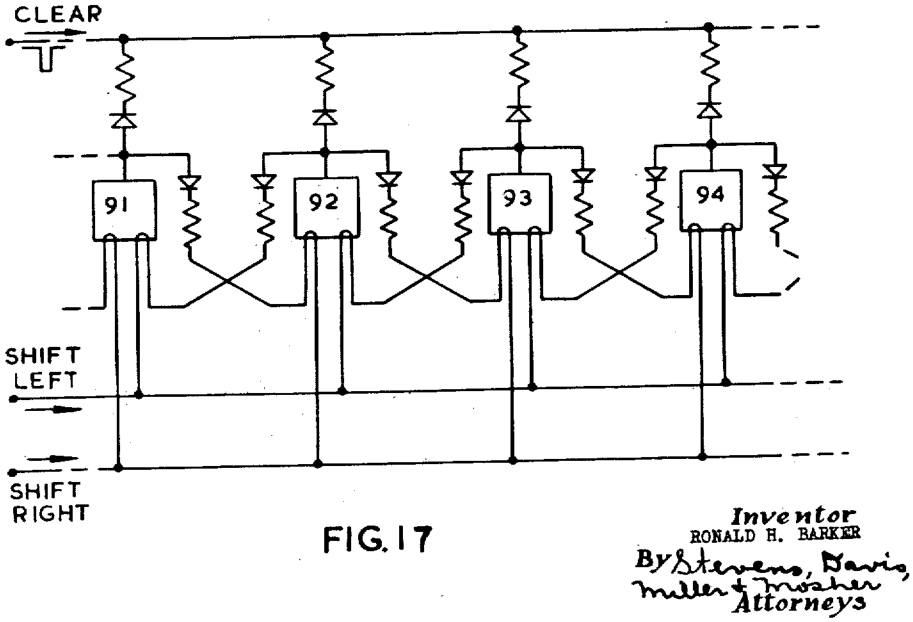

The arrangement shown in Figure 16 is the simplest form of shifting register, or delay chain. The facility is sometimes required, however, of being able to shift the number stored in a register either to right or to left. An arrangement providing this facility is illustrated in Figure 17 which shows four successive stages provided by units 91, 92, 93 and 94.

The three bus-bars labelled "Clear," "Shift left" and "Shift right" are normally biased sufficiently positive for the rectifiers in the circuits connected to them not to conduct. A negative pulse of suitable amplitude (approximately equal to the amplitude of the R. F. voltage across a resonant circuit) applied to any one of these bus-bars initiates the indicated operation. The "clear" operation sets all the units in the non-resonant state. It is possible to set them all in the resonant state by applying an extra large negative pulse to either of the shift wires.

More complicated arithmetic units, such as multipliers, dividers, etc., may be built up from the basic elements described in various ways closely analogous to those at present in use in apparatus employing more orthodox methods of binary representation.

I claim:

1. A two-state electrical circuit comprising a capacitor and a ferroresonant circuit arranged in series, the ferroresonant circuit consisting of an inductor having a magnetic core and a capacitor connected in parallel with the inductor, means for applying an alternating electrical current across the capacitor and ferroresonant circuit whereby the ferroresonant circuit can operate stably in only two distinctly different states, one of which is a resonant state in which the circuit is resonant and the core of the inductor is magnetically saturated, and an output connection from the ferroresonant circuit on which signals of one of two types are produced in accordance with the state of the ferroresonant circuit.

2. A succession of two-state electrical circuits comprising an impedance and a ferroresonant circuit arranged in series, the ferroresonant circuit consisting of an inductor having a magnetic core and a capacitor connected in parallel with the inductor, means for applying an alternating electrical current across the impedance and ferroresonant circuit whereby the ferroresonant circuit can operate stably in only two distinctly different states, one of which is a resonant state in which the circuit is resonant and the core of the inductor is magnetically saturated, and an output connection from the ferroresonant circuit on which signals of one of two types are produced in accordance with the state of the ferroresonant circuit, said inductor in each ferroresonant circuit having a centre-tap, a triggering capacitor connected to each centre-tap, a unilateral conducting device connecting the output connection of the ferroresonant circuit of each two-state circuit to the triggering capacitor of the following two-state circuit, means for temporarily reducing the amplitude of the alternating current supply to all the two-state circuits so that no circuit can remain in a resonant state and the resulting change in potential on the output connection of a ferroresonant circuit in a resonant state charges up the triggering capacitor of the following two-state circuit, and means for applying a transfer pulse to the triggering capacitor of each two-state circuit just after the amplitude of the alternating current supply has been reduced to discharge each charged capacitor and thereby trigger the ferroresonant circuit to which the capacitor is connected into a resonant state.

3. A succession of two-state electrical circuits comprising an impedance and a ferroresonant circuit arranged in series, the ferroresonant circuit consisting of an inductor having a magnetic core and a capacitor connected in parallel with the inductor, means for applying an alternating electrical current across the impedance and ferroresonant circuit whereby the ferroresonant circuit can operate stably in only two distinctly different states, one of which is a resonant state in which the circuit is resonant and the core of the inductor is magnetically saturated, and an output connection from the ferroresonant circuit on which signals of one of two types are produced in accordance with the state of the ferroresonant circuit, said alternate current applies to said circuits consisting of a first alternating current supply to which every third circuit starting from the first is connected and which is of sufficient amplitude only during every third signal period starting from a first signal period to maintain any of these supplied circuits in the resonant state, a second alternating current supply to which every third circuit starting from the second is connected and which is of sufficient amplitude only during every third signal period starting from the second signal period to maintain any of these supplied circuits in the resonant state, a third alternating current supply to which every third circuit starting from the third is connected and which is of sufficient amplitude only during every third signal period starting from the third signal period to maintain any of these supplied circuits in the resonant state, and means for triggering the first circuit into the resonant state at intervals which are not less than three signal periods, the inductor in any circuit being coupled to the inductor in the following circuit whereby a circuit in the resonant state will induce the following circuit into the resonant state during the next signal period that the alternating current supply to this following circuit is of sufficient amplitude to maintain it in the resonant state.

4. A two-state electrical circuit comprising an impedance and a ferroresonant circuit arranged in series, the ferroresonant circuit consisting of an inductor having a magnetic core and a capacitor connected in parallel with the inductor, means for applying an alternating electrical current across the impedance and ferroresonant circuit whereby the ferroresonant circuit can operate stably in only two distinctly different states, one of which is a resonant state in which the circuit is resonant and the core of the inductor is magnetically saturated, an output connection from the ferroresonant circuit on which signals of one of two types are produced in accordance with the state of the ferroresonant circuit, said magnetic core having at least one triggering winding wound around said core, and a capacitor connected in parallel with the triggering winding.

5. A succession of electrical circuits according to claim 4 and a unilateral conducting device connecting the output connection of the ferroresonant circuit of each electrical circuit to the triggering winding of the following circuit, and means for applying a pulse to the triggering winding of each circuit which loads the ferroresonant circuit of the previous circuit to make it unable to resonate.

6. A trigger circuit comprising a pair of two-state circuits each according to claim 4 and in which the inductors of each two-state circuit are mutually coupled together in such a sense that when one circuit is in the resonant state the other circuit cannot be.

7. A trigger circuit according to claim 6 and a common triggering input connection to the triggering windings of the two two-state circuits whereby a triggering pulse applied to the common triggering input connection can change the state of the trigger circuit.

8. A trigger circuit according to claim 7 and a unilateral conducting device connected to the output connection of each two-state circuit, and means for applying to the two output connections an electrical pulse which so loads the two two-state circuits that neither can remain in the resonant state.

9. A trigger circuit according to claim 7 and in which a unilateral conducting device is connected between the triggering windings of each two-state circuit and the common triggering input connection, the two unilateral conducting being connected in opposite senses to the common triggering input connection whereby the trigger circuit is triggered into one or the other of its two states in accordance with the direction of the flow of current in the common triggering input connection.

10. An electrical circuit arrangement comprising at least two electrical circuits according to claim 4 and arranged in parallel, means for applying signals to the triggering windings of said electrical circuits, a further electrical circuit according to claim 4 acting as an output circuit, means for applying the output of the said electrical circuits in parallel through unilateral conducting devices to the triggering winding of said output electrical circuit, and means for applying a transfer pulse to the triggering winding of said output electrical circuit to set it in the resonant state if a signal has been also applied to any one of the said electrical circuits.

11. A trigger circuit according to claim 4 and in which the inductors of each two-state circuit are mutually coupled together in such a sense that when one circuit is in the resonant state the other circuit cannot be, and means for biasing the values of the circuit components so that a first one of the two-state circuits is in the non-resonant state and a second one of the two-state circuits is in the resonant state during normal quiescent conditions.

12. An electrical circuit arrangement comprising at least two trigger circuits according to claim 11 arranged as parallel input circuits, means for applying input signals to the triggering windings of the first two-state circuits of said trigger circuits, a further trigger circuit according to claim 20 acting as an output circuit, means for applying a transfer pulse direct to and the output of the second-two state circuits of the said input trigger circuits through unilateral conducting devices to the triggering winding of the first two-state circuit of said output trigger circuit, whereby the second two-state circuit of the output trigger circuit remains in the resonant state only if a signal has been applied to the triggering windings of the first two-state circuits of all the input trigger circuits.

13. An electrical circuit arrangement comprising two electrical circuits according to claim 4 arranged in parallel, means for applying input signals to the triggering windings of said electrical circuits, an output electrical circuit which consists of an electrical circuit according to claim 4, having two similar triggering windings, means for applying the output of the two electrical circuits in parallel through unilateral conducting devices separately to the two triggering windings of the said output electrical circuit whereby the output circuit is affected in opposite senses by input signals on the two triggering windings of the said electrical circuits.

14. An electrical circuit arrangement comprising a chain of electrical circuits each according to claim 4 and having two similar triggering windings, means for applying through separate unilateral conducting devices the output of each electrical circuit to a second triggering winding of the preceding electrical circuit and a first triggering winding of the succeeding electrical circuit in the chain, means for applying a first shift pulse to all the first triggering windings of the electrical circuits, and means for applying a second shift pulse to all the second triggering windings of the electrical circuits.

15. An electrical circuit arrangement according to claim 14 and having a common line, a connection through a unilateral conducting device from the output of each electrical circuit to said common line, and means for applying a pulse to said common line to set all the electrical circuits in the non-resonant state.

16. An electrical circuit arrangement comprising a series of trigger circuits each according to claim 6, a signal transfer path from the output of one two-state circuit of one trigger circuit to the triggering windings of both two-state circuits of the following trigger circuit, a capacitor and a unilateral conducting device in each transfer path, and a discharge path for each capacitor.

References Cited in the file of this patent

UNITED STATES PATENTS

| | | |
|---|---|---|
| 2,653,254 | Spitzer et al. | Sept. 22, 1953 |
| 2,682,615 | Sziklai et al. | June 29, 1954 |

UNITED STATES PATENT OFFICE

CERTIFICATE OF CORRECTION

Patent No. 2,795,706 June 11, 1957

Roland Hugh Barker

It is hereby certified that error appears in the printed specification of the above numbered patent requiring correction and that the said Letters Patent should read as corrected below.

Column 10, line 58, for "conducting" read -- conducting devices --; column 11, line 13, for the claim reference numeral "20" read -- 11 --.

Signed and sealed this 16th day of June 1959.

(SEAL)
Attest:

KARL H. AXLINE
Attesting Officer

ROBERT C. WATSON
Commissioner of Patents